H. K. KISO.
HORSESHOE.
APPLICATION FILED JAN. 20, 1911.

1,054,563.

Patented Feb. 25, 1913.
2 SHEETS—SHEET 1.

WITNESSES

INVENTOR
Henry K. Kiso

ATTORNEYS

H. K. KISO.
HORSESHOE.
APPLICATION FILED JAN. 20, 1911.

1,054,563.

Patented Feb. 25, 1913.
2 SHEETS—SHEET 2.

WITNESSES

INVENTOR
Henry K. Kiso
BY
ATTORNEYS

UNITED STATES PATENT OFFICE.

HENRY K. KISO, OF NEW YORK, N. Y.

HORSESHOE.

1,054,563.   Specification of Letters Patent.   Patented Feb. 25, 1913.

Application filed January 20, 1911. Serial No. 603,633.

*To all whom it may concern:*

Be it known that I, HENRY K. KISO, a subject of the Emperor of Japan, and a resident of the city of New York, borough of Manhattan, in the county and State of New York, have invented a new and Improved Horseshoe, of which the following is a full, clear, and exact description.

My invention relates to an overshoe for horses and other animals.

An object of my invention is to provide an overshoe to fit on the hoof of an animal over the ordinary shoe, in order to prevent slipping or sliding on ice or wet pavements, and which is so constructed that the different parts may be readily attached together and to the hoof of the animal, said overshoe being so arranged that the different parts brace one another and readily conform to the configuration of the hoof. I attain this object by placing a reinforced pad under the hoof and fasten this pad to the hoof by means of a particular framework and straps.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1:
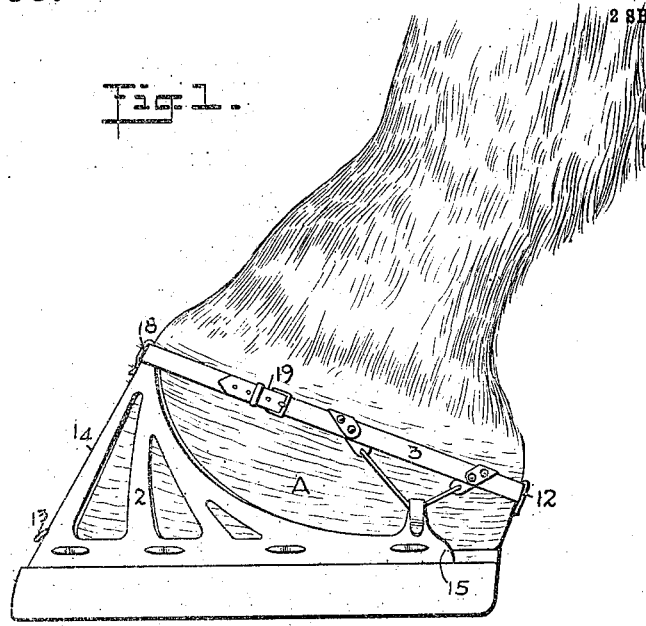
Figure 2:
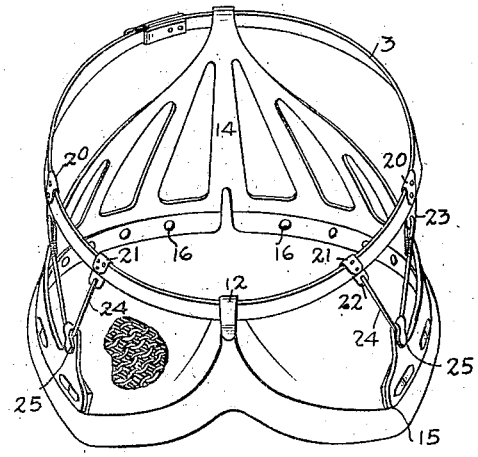
Figure 3:
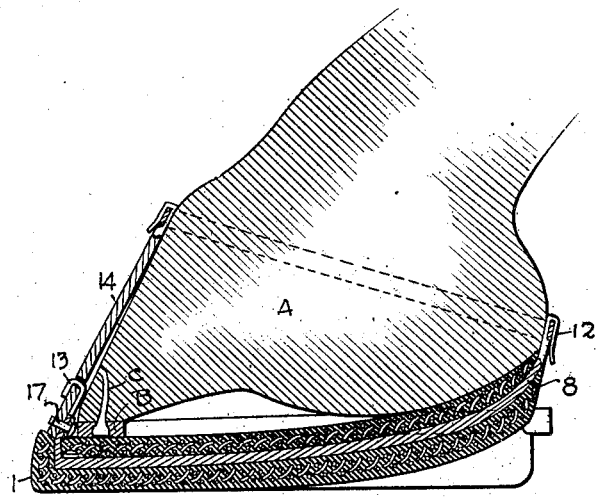
Figure 4:
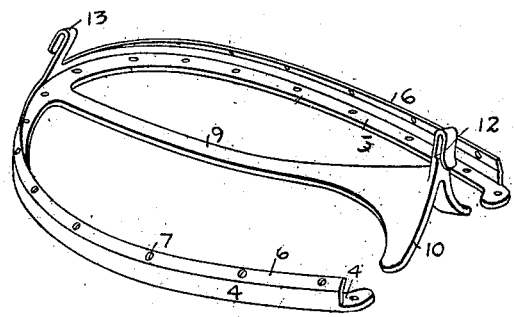

Figure 1 is a side elevation showing a preferred embodiment of my invention attached to the hoof of an animal; Fig. 2 is a detailed perspective view looking down on my overshoe; Fig. 3 is a vertical sectional view through the center of my shoe; and Fig. 4 is a detailed perspective view showing the reinforcement for the pad detached from the shoe.

In the above illustrations, I have shown a hoof A having the ordinary form of shoe B, held by the horseshoe nails C, and over which is positioned a preferred embodiment of my improved overshoe.

The pad 1 comprises a thickness of rubber or some similar resilient material, conforming substantially to the contour of the hoof, and diffused throughout this pad is a series of woven wires having more or less resiliency and having a net-like appearance, being interwoven and intermated throughout the body of the pad, so that as the lower portion of the rubber is slightly worn away, the embedded woven wires will be brought flush with the bottom of the shoe, to act as an anti-slipping surface, thereby preventing any slipping between the pad and the shoe on an icy, snowy or slippery surface. Centrally disposed in this pad is a reinforcement 8, preferably of some metallic substance, substantially U-shaped in configuration, having sides 4 and 5, from each of which projects an upwardly-extending flange 6 above the upper surface of the pad 1. Extending through the flange 6 are a number of apertures 7, for a purpose hereinafter described. This reinforcement 8 has a longitudinally-extending rib 9, extending longitudinally from the crotch of the U-shaped member centrally through the flexible member, and terminating in a broad bearing plate 10, the end of which plate has an integrally-formed hook 12, which hook projects above the surface of the pad 1. The flange 6 has formed on its edge opposite the hook 12, an oppositely-disposed hook 13, for a purpose hereinafter described.

Positioned above the flange 6 is an upper framework 2, preferably of metal, extending up some considerable distance in front of the hook, as shown at 14, and converging downward to the rear edge of the flange as shown at 15. The lower edge of the framework has perforations 16 alined with the perforations 7 in the flange 6, and the framework is held to the pad 1 by pins 17 passing through the apertures 7 and 16, as shown in Fig. 3. The front 14 of the framework 2 converges upward and terminates in a hook 18, through which passes a strap 3 encircling the upper part of the hoof and held at the rear by means of the hook 12. The ends of this strap 3 are held together by a buckle connection 19, whereby the shoe may be adjusted to different sized hoofs. Positioned on opposite sides toward the rear of this strap, are lugs 20 and 21, carrying projecting ears 22 and 23, from which is suspended a flexible connection 24 engaging hooks 25 at the end 15 of the framework 2, whereby the encircling strap 3 is firmly attached to and spaced above the framework.

Having thus described my invention, I claim as new and desire to secure by Letters Patent:

1. In an overshoe to be positioned on the hoof of an animal, a bottom member, a framework positioned on said bottom member, and a flexible binding means encircling the hoof and connecting different parts of said framework and adapted to hold said bottom member and framework to the hoof, and a flexible connection attached to said binding means and having a sliding connection with said framework.

2. A horseshoe comprising a pad, a U-shaped reinforcement in said pad, said reinforcement having a longitudinally extending rib integral with the reinforcement and disposed between the legs of the U, said rib terminating in a broad bearing plate having a hook end extending above the top of the pad, and means engaging said hooked end whereby the shoe may be attached to the hoof.

3. In a horseshoe comprising a resilient pad having a reinforcement therein and projecting therefrom, hooks on said projecting portion of said reinforcement, a band encircling the hoof and engaging certain of said hooks, and means attached to said band engaging certain of said hooks.

4. In a horseshoe, a bottom member, a reinforcement in said member, flanges projecting from said reinforcement and conforming in configuration to the hoof of the animal, said reinforcement comprising a longitudinally-extending rib, and means attached to said flanges and rib, whereby the bottom member is removably fastened to said hoof.

In testimony whereof I have signed my name to this specification in the presence of two subscribing witnesses.

HENRY K. KISO.

Witnesses:
W. S. ORTON,
PHILIP D. ROLLHAUS.